US012677271B2

(12) United States Patent
Zhu

(10) Patent No.: US 12,677,271 B2
(45) Date of Patent: Jul. 7, 2026

(54) PERFORMING DOWNLINK DATA RECEIVING OR UPLINK DATA SENDING IN A TARGET TIME UNIT

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

(21) Appl. No.: 18/266,170

(22) PCT Filed: Dec. 11, 2020

(86) PCT No.: PCT/CN2020/135885
§ 371 (c)(1),
(2) Date: Jun. 8, 2023

(87) PCT Pub. No.: WO2022/120834
PCT Pub. Date: Jun. 16, 2022

(65) Prior Publication Data
US 2024/0098731 A1     Mar. 21, 2024

(51) Int. Cl.
*H04W 72/1263* (2023.01)
*H04L 1/1812* (2023.01)
*H04W 72/0457* (2023.01)
*H04W 84/06* (2009.01)

(52) U.S. Cl.
CPC ....... *H04W 72/1263* (2013.01); *H04L 1/1812* (2013.01); *H04W 72/0457* (2023.01); *H04W 84/06* (2013.01)

(58) Field of Classification Search
CPC ......... H04W 72/1263; H04W 72/0457; H04W 84/06; H04W 72/23; H04W 56/00; H04L 1/1812; H04L 1/1861; H04L 25/02; H04L 5/00; H04B 7/185
See application file for complete search history.

(56) References Cited

U.S. PATENT DOCUMENTS

| | | | |
|---|---|---|---|
| 2016/0050601 A1* | 2/2016 | Jeong .................. | H04W 36/142 |
| | | | 455/436 |
| 2017/0324528 A1 | 11/2017 | Rico Alvarino et al. | |
| 2019/0166607 A1 | 5/2019 | Zhou et al. | |
| 2019/0230657 A1* | 7/2019 | Kim .................. | H04W 72/0446 |
| 2019/0261454 A1 | 8/2019 | Xiong et al. | |

(Continued)

FOREIGN PATENT DOCUMENTS

| | | |
|---|---|---|
| CN | 109478965 A | 3/2019 |
| CN | 109803429 A | 5/2019 |

(Continued)

OTHER PUBLICATIONS

State Intellectual Property Office of the People's Republic of China, Office Action and Search Report Issued in Application No. 2020800039378, Dec. 21, 2023, 23 pages.

(Continued)

*Primary Examiner* — Mewale A Ambaye
(74) *Attorney, Agent, or Firm* — Volpe Koenig

(57) ABSTRACT
A data transmission method includes: in response to determining an uplink and downlink transmission conflict in a target time unit, performing downlink data receiving or uplink data sending in the target time unit.

15 Claims, 7 Drawing Sheets

(56) References Cited

U.S. PATENT DOCUMENTS

| | | |
|---|---|---|
| 2019/0312704 A1 | 10/2019 | Rico Alvarino et al. |
| 2020/0037314 A1 | 1/2020 | Xiong et al. |
| 2021/0014011 A1* | 1/2021 | Xiong ................... H04L 1/1887 |

FOREIGN PATENT DOCUMENTS

| | | | |
|---|---|---|---|
| CN | 110475366 A | | 11/2019 |
| CN | 110476472 | * | 11/2019 |
| CN | 110476472 A | | 11/2019 |
| CN | 111130727 | * | 5/2020 |
| CN | 111130727 A | | 5/2020 |
| CN | 111373823 A | | 7/2020 |
| CN | 111434064 A | | 7/2020 |
| CN | 111756661 A | | 10/2020 |
| WO | 2018232898 A1 | | 12/2018 |

OTHER PUBLICATIONS

ISA State Intellectual Property Office of the People's Republic of China, Written Opinion of the International Searching Authority Issued in Application No. PCT/CN2020/135885, Sep. 9, 2021, WIPO, 8 pages.
ISA State Intellectual Property Office of the People's Republic of China, International Search Report Issued in Application No. PCT/CN2020/135885, Sep. 9, 2021, WIPO, 4 pages.

* cited by examiner

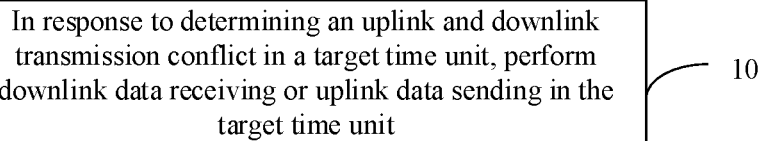

In response to determining an uplink and downlink transmission conflict in a target time unit, perform downlink data receiving or uplink data sending in the target time unit —— 101

FIG. 1

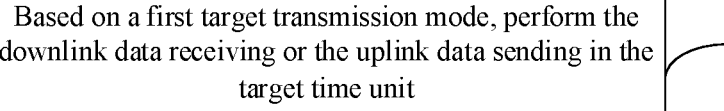

Based on a first target transmission mode, perform the downlink data receiving or the uplink data sending in the target time unit —— 201

FIG. 2

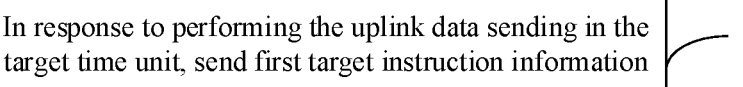

In response to performing the uplink data sending in the target time unit, send first target instruction information —— 301

FIG. 3

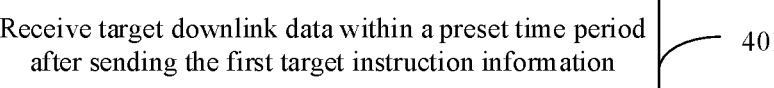

Receive target downlink data within a preset time period after sending the first target instruction information —— 401

FIG. 4

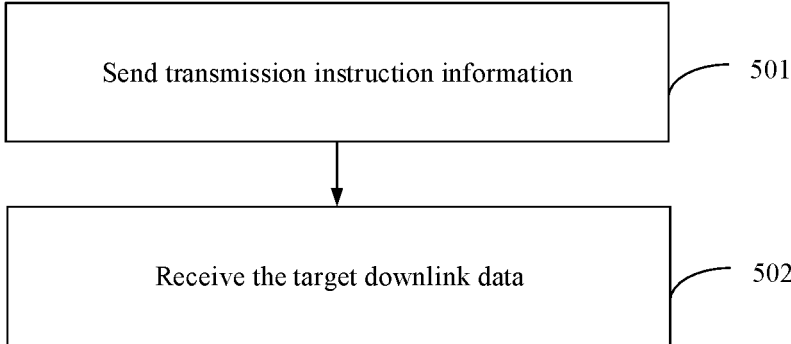

Send transmission instruction information —— 501

Receive the target downlink data —— 502

FIG. 5

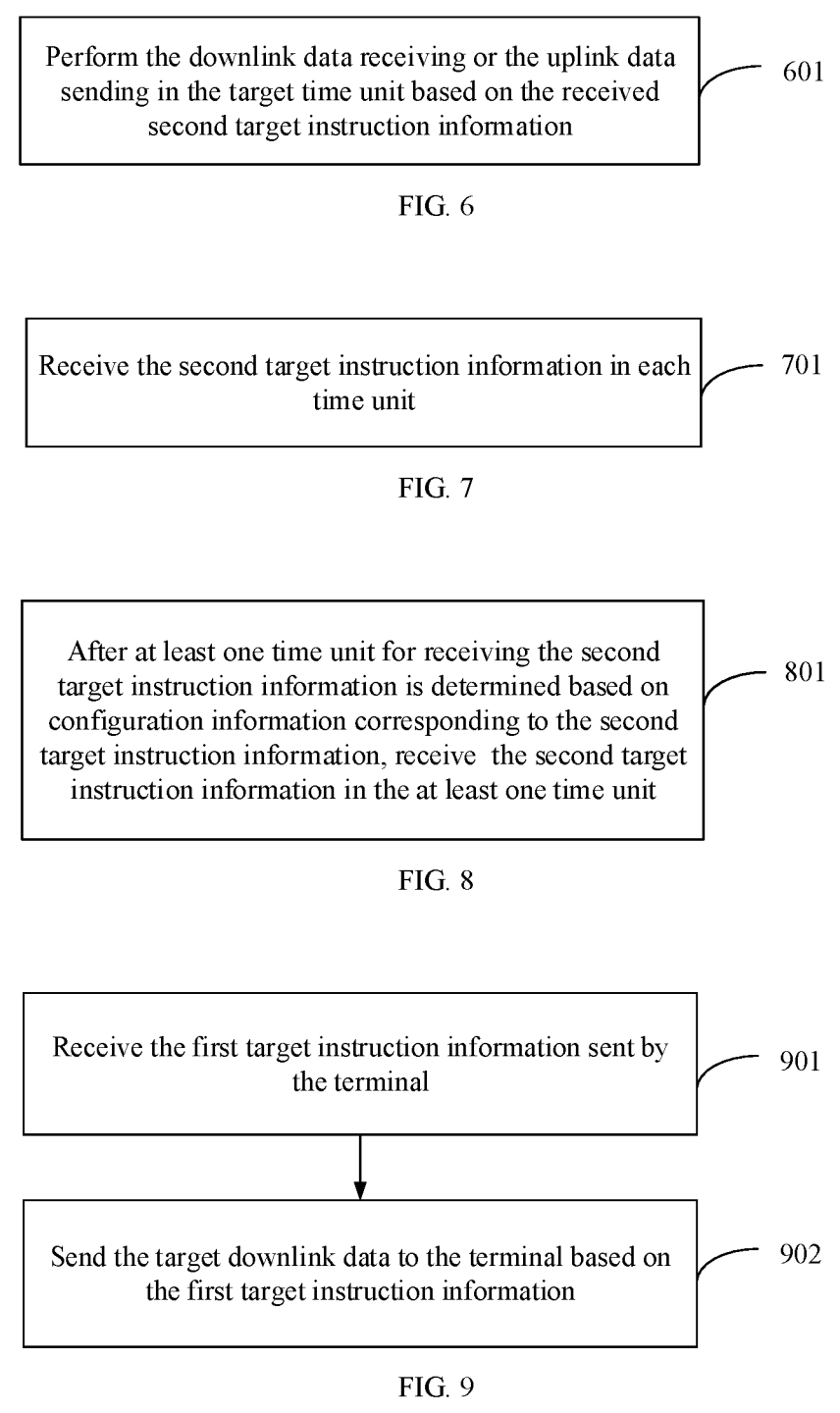

Perform the downlink data receiving or the uplink data sending in the target time unit based on the received second target instruction information ⟋ 601

FIG. 6

Receive the second target instruction information in each time unit ⟋ 701

FIG. 7

After at least one time unit for receiving the second target instruction information is determined based on configuration information corresponding to the second target instruction information, receive the second target instruction information in the at least one time unit ⟋ 801

FIG. 8

Receive the first target instruction information sent by the terminal ⟋ 901

Send the target downlink data to the terminal based on the first target instruction information ⟋ 902

FIG. 9

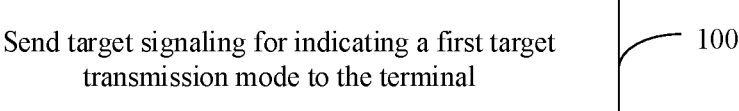
| Send target signaling for indicating a first target transmission mode to the terminal | 1001 |
FIG. 10
| In response to determining a possible uplink and downlink transmission conflict for the terminal in the target time unit, send the second target instruction information to the terminal | 1101 |
FIG. 11
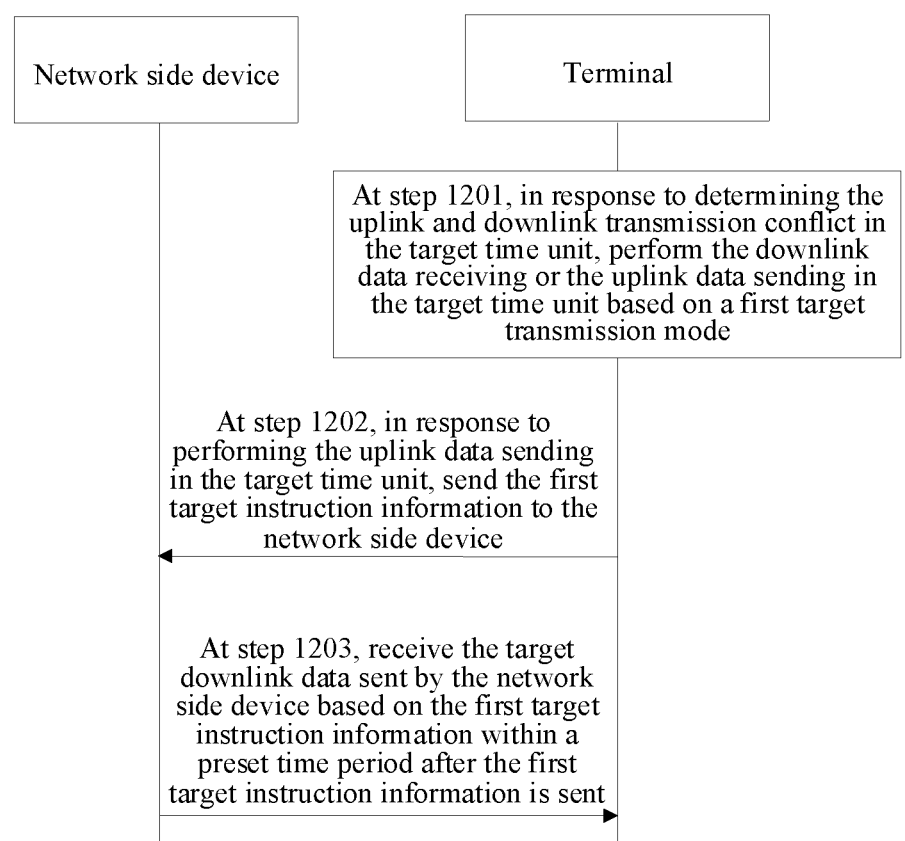
FIG. 12

PERFORMING DOWNLINK DATA RECEIVING OR UPLINK DATA SENDING IN A TARGET TIME UNIT

CROSS-REFERENCE TO RELATED APPLICATION

This application is a National Stage of International Application No. PCT/CN2020/135885, filed on Dec. 11, 2020, the contents of all of which are incorporated herein by reference in their entirety.

TECHNICAL FIELD

The present disclosure relates to the field of communication technologies, and in particular to a data transmission method, a data transmission apparatus, and a storage medium.

BACKGROUND

In the research of wireless communication technology, satellite communication is considered an important aspect of the future development of wireless communication technology. Satellite communication refers to the communication by radio communication equipment on the ground using satellites as relays. The satellite communication system includes a satellite part and a ground part. The characteristics of satellite communication include that: the communication range is large; the communication can occur between any two points within the range covered by the radio waves emitted by the satellite; and the communication is not easily affected by land disasters (high reliability). As a supplement to the current terrestrial cellular communication system, satellite communication can have the following benefits. First, satellite communication can achieve extended coverage for areas that cannot be covered by the current cellular communication system or have high coverage costs, such as oceans, deserts, remote mountainous areas, etc., the satellite communication can be used to solve the above-mentioned communication problems. Second, satellite communication can be used for emergency communications, for example, in the event of a disaster such as an earthquake, which makes the cellular communication infrastructure unavailable, satellite communication can be used to quickly establish a communication connection. In addition, satellite communication can provide industry applications, for example, for long-distance transmission of delay-sensitive services, satellite communication can be used to reduce the delay of service transmission.

It is foreseeable that in the future, wireless communication systems, the satellite communication system, and the land cellular communication system will gradually achieve deep integration, and truly realize the intelligent connection of everything.

In the current land communication system, data transmission is generally based on scheduling, which means that the base station instructs the terminal to send or receive data at the indicated time and frequency resource location through scheduling instructions. Alternatively, the base station may pre-configure the resources for sending or receiving data at the terminal, such that the terminal sends or receives data at the corresponding time and frequency resource location based on the configuration information.

However, for some terminals, due to the capacity of the terminal, only half-duplex transmission mode is supported. That is, either downlink data receiving or uplink data sending is performed in one time unit, and the data receiving and the data sending cannot be performed simultaneously. However, in the scenario of non-terrestrial network (NTN), since there is propagation delay, the satellite may not know the timing of the downlink and uplink of the terminal accurately, as a result, there may be a situation where the terminal receives scheduling for downlink receiving and uplink sending, and instructing the terminal to perform both uplink transmission and downlink transmission simultaneously in at least one time unit.

SUMMARY

To overcome the problems in the related art, embodiments of the present disclosure provide a data transmission method, a data transmission apparatus, and a readable storage medium.

According to a first aspect of the embodiments of the present disclosure, a data transmission method is provided, and the method is applied to a terminal, and includes:

In response to determining an uplink and downlink transmission conflict in a target time unit, performing downlink data receiving or uplink data sending in the target time unit.

In an embodiment, performing the downlink data receiving or the uplink data sending in the target time unit includes:

performing, based on a first target transmission mode, the downlink data receiving or the uplink data sending in the target time unit.

According to a second aspect of the embodiments of the present disclosure, a data transmission method is provided, and the method is applied to a network side device, and includes:

receiving first target instruction information sent by a terminal, where the first target instruction information is configured to indicate that the terminal does not perform downlink data receiving in a target time unit, and the target time unit is a time unit when there is an uplink and downlink transmission conflict; and sending, based on the first target instruction information, target downlink data to the terminal, where the target downlink data is downlink data that is not received by the terminal in the target time unit.

According to a third aspect of the embodiments of the present disclosure, a data transmission method is provided, and the method is applied to a network side device, and includes:

in response to determining a possible uplink and downlink transmission conflict for a terminal in a target time unit, sending second target instruction information to the terminal, where the second target instruction information is configured to instruct the terminal to perform downlink data receiving or uplink data sending in the target time unit when there is an uplink and downlink transmission conflict in the target time unit.

According to a fourth aspect of the embodiments of the present disclosure, a data transmission device is provided, and the device includes:

a processor;

a memory storing instructions executable by the processor;

where the processor is configured to perform the data transmission method of any one according to the first aspect.

According to a fifth aspect of the embodiments of the present disclosure, a data transmission device is provided, the device includes:

a processor;

a memory storing instructions executable by the processor;

where the processor is configured to perform the data transmission method of any one according to the second aspect or the data transmission method of any one according to the third aspect.

It will be understood that the above general description and the later detailed description are only exemplary and explanatory and do not limit the present disclosure.

BRIEF DESCRIPTION OF DRAWINGS

The accompanying drawings herein are incorporated into and form part of the specification, illustrate embodiments consistent with the present disclosure, and are used in conjunction with the specification to explain the principles of the present disclosure.

FIG. 1 is a schematic flowchart illustrating a data transmission method according to an exemplary embodiment of the present disclosure.

FIG. 2 is a schematic flowchart illustrating a data transmission method according to another exemplary embodiment of the present disclosure.

FIG. 3 is a schematic flowchart illustrating a data transmission method according to yet another exemplary embodiment of the present disclosure.

FIG. 4 is a schematic flowchart illustrating a data transmission method according to still another exemplary embodiment of the present disclosure.

FIG. 5 is a schematic flowchart illustrating a data transmission method according to still another exemplary embodiment of the present disclosure.

FIG. 6 is a schematic flowchart illustrating a data transmission method according to still another exemplary embodiment of the present disclosure.

FIG. 7 is a schematic flowchart illustrating a data transmission method according to still another exemplary embodiment of the present disclosure.

FIG. 8 is a schematic flowchart illustrating a data transmission method according to still another exemplary embodiment of the present disclosure.

FIG. 9 is a schematic flowchart illustrating a data transmission method according to still another exemplary embodiment of the present disclosure.

FIG. 10 is a schematic flowchart illustrating a data transmission method according to still another exemplary embodiment of the present disclosure.

FIG. 11 is a schematic flowchart illustrating a data transmission method according to still another exemplary embodiment of the present disclosure.

FIG. 12 is a schematic flowchart illustrating a data transmission method according to still another exemplary embodiment of the present disclosure.

DETAILED DESCRIPTION

Figure 13:
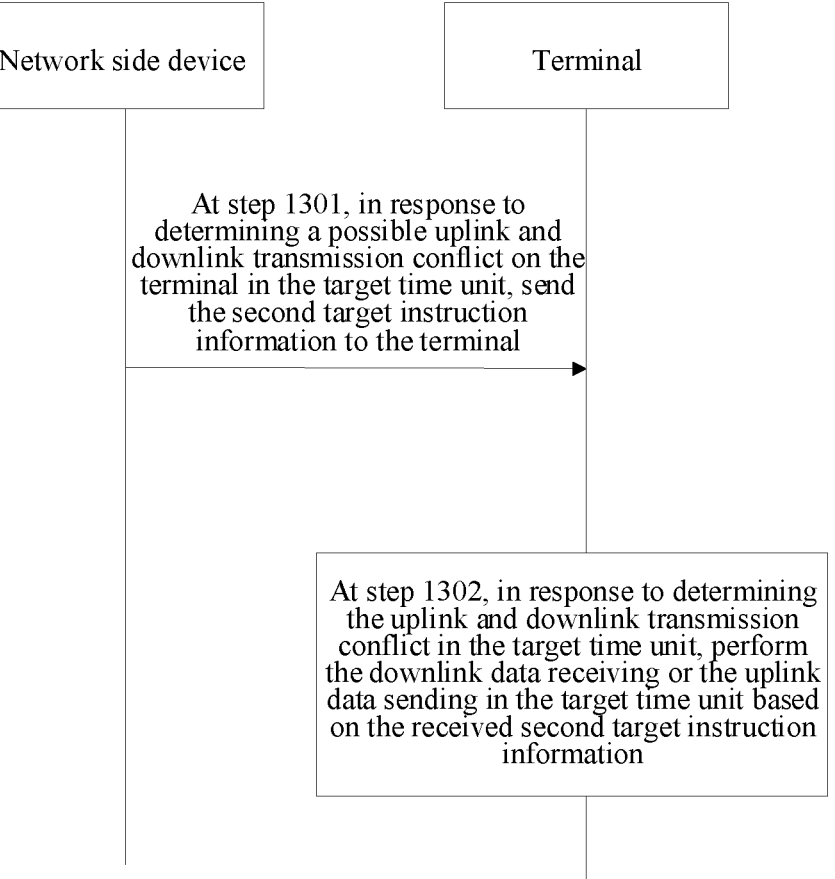
FIG. 13 is a schematic flowchart illustrating a data transmission method according to still another exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the", and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

A data transmission method provided by the present disclosure is described below from a terminal side first.

Embodiments of the present disclosure provide a data transmission method, with reference to FIG. 1, FIG. 1 is a schematic flowchart illustrating a data transmission method according to an exemplary embodiment of the present disclosure, the data transmission method is applied to the terminal, including but being not limited to a terminal that supports half-duplex, which refers to perform either uplink data sending or downlink data receiving in a time unit, and does not support synchronous data sending and receiving. The half-duplex terminal may be a narrow-band internet of things (NB-IoT) device. The method may include the following step 101.

At step 101, in response to determining an uplink and downlink transmission conflict in a target time unit, downlink data receiving or uplink data sending in the target time unit is performed.

In the embodiments of the present disclosure, the target time unit is a time unit when there is an uplink and downlink transmission conflict. The time unit may include, but is not limited to, a slot. The terminal performs the downlink data receiving or the uplink data sending in the target time unit.

In the above embodiment, the terminal performs the downlink data receiving or the uplink data sending in the target time unit when there is an uplink and downlink transmission conflict, such that the problem of the uplink and downlink transmission conflict can be effectively solved in satellite communication.

In some embodiments, with reference to FIG. 2, FIG. 2 is a flowchart of another data transmission method according to the embodiment shown in FIG. 1. Performing the downlink data receiving or the uplink data sending in the target time unit may include the following step 201.

At step 201, based on a first target transmission mode, the downlink data receiving or the uplink data sending in the target time unit is performed.

In the embodiments of the present disclosure, the first target transmission mode is configured to instruct the terminal to perform the downlink data receiving or the uplink data sending in the target time unit. In the target time unit during which there is the uplink and downlink transmission conflict, if the first target transmission mode instructs the terminal to perform the downlink data receiving, the terminal performs the downlink data receiving, and if the first target transmission mode instructs the terminal to perform the uplink data sending, the terminal performs the uplink data sending.

In the above embodiment, based on the first target transmission mode, the downlink data receiving or the uplink data sending can be performed in the target time unit when there is an uplink and downlink transmission conflict, such that the problem of the uplink and downlink transmission conflict can be effectively solved in the satellite communication.

In some embodiments, the first target transmission mode may be determined according to a predefined setting, such as a protocol.

In the above embodiment, the terminal can determine the first target transmission mode based on the protocol, so that in the target time unit during which there is the uplink and downlink transmission conflict, the downlink data receiving or the uplink data sending is performed based on the first target transmission mode, thereby the problem of the uplink and downlink transmission conflict in the satellite communication is solved.

In some embodiments, the first target transmission mode may be determined based on the received target signaling. The target signaling includes, but is not limited to, high-level signaling or physical layer signaling. The high-level signaling may include, but is not limited to, radio resource control (RRC) signaling or media access control address (MAC) control element (CE) signaling. In the above embodiment, the terminal can determine the first target transmission mode based on the received target signaling, so as to perform the downlink data receiving or the uplink data sending based on the instruction of the target transmission mode in the target time unit when there is the uplink and downlink transmission conflict, thereby the problem of the uplink and downlink transmission conflict in the satellite communication is solved.

In some embodiments, with reference to FIG. 3, FIG. 3 is a schematic flowchart illustrating a data transmission method according to yet another exemplary embodiment of the present disclosure, and the method may include the following step 301.

At step 301, in response to performing the uplink data sending in the target time unit, first target instruction information is sent.

If the uplink data sending is performed in the target time unit, i.e., the terminal drops the downlink data receiving, the terminal may send the first target instruction information. The first target instruction information is configured to indicate that the terminal does not perform the downlink data receiving in the target time unit.

In the above embodiment, if the terminal drops the downlink data receiving in the target time unit, the terminal may send the first target instruction information, such that the network side device sends target downlink data to the terminal based on the first target instruction information, thereby the problem of the uplink and downlink transmission conflict in the satellite communication is solved, and the normal operations of terminal services are ensured.

In some embodiments, the terminal can send the first target instruction information through an uplink data channel or an uplink control channel.

In an example, the terminal may multiplex the hybrid automatic repeat request (HARQ) instruction information to send the first target instruction information.

In this embodiment of the present disclosure, the purpose of multiplexing the HARQ instruction information to send the first target instruction information may be achieved by, but not limited to, 2 bits.

In an embodiment, the terminal indicates different information content by setting the HARQ instruction information to different bit values. For example, the HARQ instruction information is set to "00" which may indicate that "the downlink data is received by the terminal, but is not correctly demodulated"; the HARQ instruction information is set to "01" which may indicate that "the downlink data is received by the terminal, and is correctly demodulated", and the HARQ instruction information is set to "10" which may indicate the first target instruction information, i.e., "the terminal does not perform the downlink data receiving in the target time unit", and the bit value "11" of the HARQ instruction information may be set aside to indicate other contents subsequently.

The above is only an exemplary illustration, and any way of informing the network side device that the terminal does not perform the downlink data receiving in the target time unit by multiplexing the HARQ instruction information will fall within the scope of protection of the present disclosure.

In the above embodiments, the terminal may multiplex the HARQ instruction information to inform the network side device that the terminal does not perform the downlink data receiving in the target time unit. In this way, the network side device sends the target downlink data to the terminal, thereby solving the problem of the uplink and downlink transmission conflict in satellite communication, and ensuring the normal operations of terminal services.

In an example, new signaling may be predefined, and the predefined new signaling is configured as the first target instruction information. The terminal may send the predefined signaling as the first target instruction information to inform the network side device that the downlink data receiving is not performed within the target time unit. The predefined signaling is configured to indicate that the terminal does not perform the downlink data receiving in the target time unit, i.e., the predefined signaling is configured as the first target instruction information.

In the above embodiment, the terminal may send the predefined signaling as the first target instruction information to inform the network side device that the terminal does not perform the downlink data receiving in the target time unit. In this way, the network side device subsequently sends the target downlink data to the terminal, thereby solving the problem of the uplink and downlink transmission conflict in satellite communication, and ensuring the normal operations of terminal services.

In an example, the terminal may inform the network side device that the terminal does not perform the downlink data receiving in the target time unit, in addition to the direct manner described above, but also in an implicit manner.

In an embodiment, the terminal may send a specified signal or specified signaling at a preset location.

In the embodiments of the present disclosure, the specified signal or specified signaling may be existing signaling in the related art, but the existing signaling in the related art is not configured for indicating that the terminal does not perform the downlink data receiving in the target time unit. By sending the specified signal or specified signaling at the preset location to inform the network side device that the terminal does not perform the downlink data receiving in the target time unit, that is, the specified signal or specified signaling is sent at the preset location to send the first target instruction information.

For example, the specified signal includes a random-access precursor code, which is configured to perform random access in the related art. If the random-access precursor code is sent at the preset location, the network side device may determine that the information content indicated by the random-access precursor code indicates that the terminal does not perform the downlink data receiving in the target time unit.

In the above embodiment, the terminal may achieve the purpose of sending the first target instruction information by sending the specified signal or specified signaling at the preset location, so as to inform the network side device that the terminal does not perform the downlink data receiving in the target time unit. In this way, the network side device subsequently sends the target downlink data to the terminal, thereby solving the problem of the uplink and downlink transmission conflict in satellite communication, and ensuring the normal operations of terminal services.

In some embodiments, with reference to FIG. 4, FIG. 4 is a schematic flowchart illustrating a data transmission method according to still another exemplary embodiment of the present disclosure, and the method may include the following step 401.

At step 401, target downlink data is received within a preset time period after sending the first target instruction information.

The preset time period may include at least one time unit. The target downlink data is downlink data that is not received by the terminal in the target time unit.

In the above embodiment, the terminal can receive the target downlink data within the preset time period after the first target instruction information is sent, such that the normal operations of terminal services are ensured.

In some embodiments, with reference to FIG. 5, FIG. 5 is a schematic flowchart illustrating a data transmission method according to still another exemplary embodiment of the present disclosure, and the method may include the following steps 501 to 502.

At step 501, transmission instruction information is sent.

In embodiments of the present disclosure, the transmission instruction information may include, but is not limited to, time-domain transmission information. For example, the transmission instruction information instructs the network side device to send target downlink data to the terminal in an $n^{th}$ time unit after the first target instruction information is received, where n may be a positive integer.

At step 502, the target downlink data is received.

The target downlink data is downlink data that is not received by the terminal in the target time unit.

In the above embodiment, the terminal may send the transmission instruction information and then receive the target downlink data, such that the normal operations of terminal services are ensured.

In some embodiments, with reference to FIG. 6, FIG. 6 is a schematic flowchart illustrating a data transmission method according to still another exemplary embodiment of the present disclosure, and the method may include the following step 601.

At step 601, the downlink data receiving or the uplink data sending is performed in the target time unit based on the received second target instruction information.

In the embodiments of the present disclosure, the second target instruction information is configured to instruct the terminal to perform the downlink data receiving or the uplink data sending in the target time unit when there is an uplink and downlink transmission conflict in the target time unit.

In the above embodiment, the terminal may perform the downlink data receiving or the uplink data sending in the target time unit based on the second target instruction information. The second target instruction information is configured to instruct the terminal to perform the downlink data receiving or the uplink data sending in the target time unit when there is an uplink and downlink transmission conflict in the target time unit. In this way, the problem of the uplink and downlink transmission conflict in satellite communication is solved.

In some embodiments, the network side device pre-allocates at least one downlink (DL) bandwidth part (BWP) and/or at least one uplink (UL) bandwidth part (BWP) to the terminal.

The network side device may indicate a transmission mode of the terminal on at least one downlink bandwidth part and/or at least one uplink bandwidth part pre-allocated for the terminal by the second target instruction information. The second target instruction information may include, but is not limited to, slot format indicator (SFI) information.

In an example, if the second target instruction information is configured to indicate that the transmission mode of the terminal on at least one downlink bandwidth part is a second target transmission mode, the terminal may perform uplink data sending and drop the downlink data receiving in the target time unit.

If the second target instruction information is configured to indicate that the transmission mode of the terminal on at least one uplink bandwidth portion is a second target transmission mode, the terminal may perform the downlink data receiving and drop the uplink data sending in the target time unit.

In an example, the second target transmission mode may be a preset transmission mode in the target transmission unit, e.g., the second target transmission mode may be represented by "F".

In the above embodiment, in response to determining that the second target instruction information is configured to indicate that the transmission mode of the terminal on at least one downlink bandwidth part is a second target transmission mode, the terminal may perform the uplink data sending in the target time unit, i.e., the terminal does not perform the downlink data receiving in the target time unit. Alternatively, in response to determining that the second target instruction information is configured to indicate that the transmission mode of the terminal on at least one uplink bandwidth part is the second target transmission mode, the terminal may perform the downlink data receiving in the target time unit, i.e., the terminal does not perform the uplink data sending. The problem of the uplink and downlink transmission conflict in satellite communication is effectively solved.

In some embodiments, with reference to FIG. 7, FIG. 7 is a schematic flowchart illustrating a data transmission method according to still another exemplary embodiment of the present disclosure, and the method may include the following step 701.

At step 701, the second target instruction information is received in each time unit.

In embodiments of the present disclosure, the terminal may receive the second target instruction information in each time unit, including, but not limited to, in each slot, thereby it is determined that the uplink data sending or the downlink data receiving is performed in the target time unit.

In the above embodiment, by receiving the second target instruction information in each time unit, the purpose of performing the uplink data sending or the downlink data receiving in the target time unit based on the dynamic instruction is achieved. The problem of the uplink and downlink transmission conflict in satellite communication is effectively solved.

In some embodiments, with reference to FIG. 8, FIG. 8 is a schematic flowchart illustrating a data transmission method according to still another exemplary embodiment of the present disclosure, and the method may include the following step 801.

At step 801, after at least one time unit for receiving the second target instruction information is determined based on configuration information corresponding to the second target instruction information, the second target instruction information is received in the at least one time unit.

In the embodiments of the present disclosure, the terminal may first determine at least one time unit for receiving the second target instruction information based on the configuration information corresponding to the second target instruction information predefined by the network side device or a protocol, and thus the second target instruction information is received in at least one time unit, and based on the second target instruction information, the uplink data sending or the downlink data receiving is performed in a target time unit when there is the uplink and downlink transmission conflict.

In the above embodiment, the configuration information corresponding to the second target instruction information is configured to determine at least one time unit for receiving the second target instruction information, and the purpose of performing the uplink data sending or the downlink data receiving in the target time unit based on the dynamic instruction is also achieved. The problem of the uplink and downlink transmission conflict in satellite communication is effectively solved.

The following describes the data transmission method provided by the present disclosure from the network side device.

The embodiments of the present disclosure provide another data transmission method, with reference to FIG. 9, FIG. 9 is a schematic flowchart illustrating a data transmission method according to an exemplary embodiment of the present disclosure, and the method may be applied to the network side device. The network side device can include, but is not limited to, a base station on the ground, or a base station set on a satellite, or a satellite that implements the function of a base station, and the method can include the following steps 901 to 902.

At step 901, the first target instruction information sent by the terminal is received.

The first target instruction information is configured to indicate that the terminal does not perform the downlink data receiving in the target time unit when there is an uplink and downlink transmission conflict. The terminal may send the first target instruction information to the network side device through the uplink data channel or the uplink control channel.

In an example, the network side device may receive the first target instruction information sent by the terminal with the multiplexed HARQ instruction information.

In another example, the network side device may receive predefined signaling as the first target instruction information sent by the terminal.

In another example, if the network side device receives the specified signaling or the specified signal sent by the terminal at the preset location, it is determined that the terminal sends the first target instruction information.

At step 902, the target downlink data is sent to the terminal based on the first target instruction information.

In the embodiments of the present disclosure, the target downlink data is downlink data that is not received by the terminal in the target time unit.

In the above embodiment, the network side device can send the target downlink data to the terminal based on the first target instruction information sent by the terminal, such that the problem of the uplink and downlink transmission conflict in the satellite communication is solved, and the normal operations of terminal services are ensured.

In some embodiments, with reference to FIG. 10, FIG. 10 is a schematic flowchart illustrating a data transmission method according to another exemplary embodiment of the present disclosure, and the method may include the following step 1001.

At step 1001, target signaling for indicating a first target transmission mode is sent to the terminal.

The target signaling includes, but is not limited to, high-level signaling or physical layer signaling. The high-level signaling may include, but is not limited to, RRC signaling or MAC CE signaling. The first target transmission mode is configured to instruct the terminal to perform the downlink data receiving or the uplink data sending in the target time unit when there is the uplink and downlink transmission conflict.

In the above embodiment, the network side device can send the target signaling to the terminal, the terminal may perform downlink data receiving or uplink data sending in the target time unit when there is an uplink and downlink transmission conflict based on the first target transmission mode indicated by the target signaling, such that the problem of the uplink and downlink transmission conflict in the satellite communication is effectively solved.

In some embodiments, the network side device may send the target downlink data to the terminal within a preset time period.

Alternatively, the network side device may send the target downlink data to the terminal based on the transmission instruction information sent by the terminal. The transmission instruction information may include, but is not limited to, time domain transmission information.

In the above embodiment, the network side device may send the target downlink data to the terminal within a preset time period or send the target downlink data to the terminal based on the transmission instruction information reported by the terminal. The normal operation of terminal services is ensured.

The embodiments of the present disclosure provide a data transmission method, with reference to FIG. 11, FIG. 11 is a schematic flowchart illustrating a data transmission method according to still an exemplary embodiment of the present disclosure, the method may be applied to the network side device, and the method may include the following step 1101.

At step 1101, in response to determining a possible uplink and downlink transmission conflict for the terminal in the target time unit, the second target instruction information is sent to the terminal.

The second target instruction information is configured to instruct the terminal to perform the downlink data receiving or the uplink data sending in the target time unit if it is determined that there is an uplink and downlink transmission conflict in the target time unit.

In the above embodiment, the second target instruction information can be dynamically sent by the network side device to the terminal, thereby allowing the terminal to perform the downlink data receiving or the uplink data sending based on the second target instruction information when there is an uplink and downlink transmission conflict in the target time unit. The problem of the uplink and downlink transmission conflict in the satellite communication is effectively solved.

In some embodiments, the second target instruction information is configured to indicate to the terminal the transmission mode of the terminal on at least one downlink bandwidth part and/or at least one uplink bandwidth part pre-allocated by the base station. The second target instruction information includes, but is not limited to, SFI information.

In the above embodiment, the network side device may, by the second target instruction information, enable the terminal to perform the downlink data receiving or the uplink data sending in the target time unit. The problem of the uplink and downlink transmission conflict in the satellite communication is effectively solved.

In some embodiments, the network side device sends the second target instruction information, such that in a case that the terminal performs the uplink data sending in the target time unit, the network side device can send the target downlink data to the terminal again in a time unit after the target time unit. The target downlink data is downlink data that is not received by the terminal in the target time unit.

In the above embodiment, by the dynamic second target instruction information, in a case that the terminal performs the uplink data sending in the target time unit, the network side device subsequently sends the target downlink data to the terminal again to ensure the normal operation of terminal services.

In some embodiments, with reference to FIG. 12, FIG. 12 is a schematic flowchart illustrating a data transmission method according to an exemplary embodiment of the present disclosure, and the method may include the following steps 1201 to 1203.

At step 1201, in response to determining the uplink and downlink transmission conflict in the target time unit, the terminal performs the downlink data receiving or the uplink data sending in the target time unit based on a first target transmission mode.

In the embodiments of the present disclosure, the terminal may determine the first target transmission mode in accordance with the predefined configuration or the received target signaling.

At step 1202, in response to performing the uplink data sending in the target time unit, the terminal sends the first target instruction information to the network side device.

The first target instruction information is configured to indicate that the terminal does not perform the downlink data receiving in the target time unit.

At step 1203, the terminal receives the target downlink data sent by the network side device based on the first target instruction information within a preset time period after the first target instruction information is sent.

The target downlink data is downlink data that is not received by the terminal in the target time unit.

In the above embodiment, when there is the uplink and downlink transmission conflict in the target time unit, the terminal can perform the downlink data receiving or the uplink data sending in the target time unit based on the first target transmission mode, thus the problem of the uplink and downlink transmission conflict in satellite communication can be effectively solved. Further, if the terminal performs the uplink data sending in the target time unit, the terminal sends the first target instruction information to the network side device, such that the network side device sends the target downlink data to the terminal based on the first target instruction information, thus the normal operation of terminal services is ensured.

In some embodiments, the step 1203 may be replaced with steps 1204 to 1205 (not shown in FIG. 12).

At step 1204, the terminal sends the transmission instruction information to the network side device.

At step 1205, the network side device sends the target downlink data to the terminal based on the transmission instruction information.

In the above embodiment, the terminal can perform the downlink data receiving or the uplink data sending in the target time unit based on the first target transmission mode when there is an uplink and downlink transmission conflict in the target time unit, thus the problem of the uplink and downlink transmission conflict in satellite communication can be effectively solved. Further, if the terminal performs the uplink data sending in the target time unit, the first target instruction information is sent to the network side device, in addition the terminal can send the transmission instruction information, thereby the network side device sends the target downlink data to the terminal based on the transmission instruction information, thus the normal operation of terminal services is ensured.

In some embodiments, with reference to FIG. 13, FIG. 13 is a schematic flowchart illustrating a data transmission method according to an exemplary embodiment of the present disclosure, and the method may include the following steps 1301 to 1302.

At step 1301, in response to determining a possible uplink and downlink transmission conflict for the terminal in the target time unit, the network side device sends the second target instruction information to the terminal.

The second target instruction information is configured to instruct the terminal to perform the downlink data receiving or the uplink data sending in the target time unit when there is an uplink and downlink transmission conflict in the target time unit.

At step 1302, in response to determining the uplink and downlink transmission conflict in the target time unit, the terminal performs the downlink data receiving or the uplink data sending in the target time unit based on the received second target instruction information.

In the embodiments of the present disclosure, the terminal may receive the second target instruction information in each time unit, or receive the second target instruction information in at least one time unit after determining the at least one time unit for receiving the second target instruction information based on the configuration information corresponding to the second target instruction information.

In the embodiments of the present disclosure, if the second target instruction information instructs the terminal to perform the uplink data sending in the target time unit, the network side device may subsequently send the target downlink data to the terminal.

In the above embodiment, the terminal may also perform the downlink data receiving or the uplink data sending in the target time unit based on the received second target instruction information. The second target instruction information is configured to instruct the terminal to perform the downlink data receiving or the uplink data sending in the target time unit when there is an uplink and downlink transmission conflict in the target time unit. Thus, the problem of the uplink and downlink transmission conflict in satellite communication is solved.

Corresponding to the above-mentioned embodiment of the application function implementation method, the present disclosure further provides embodiments of the application function implementation apparatus.

Figure 14:
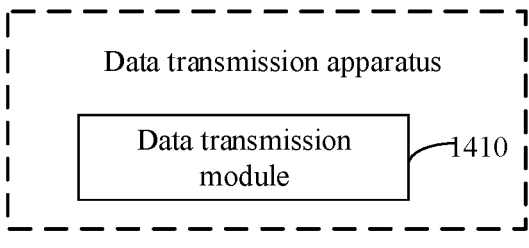
FIG. 14 is a structural block diagram illustrating a data transmission apparatus according to an exemplary embodiment of the present disclosure.

With reference to FIG. 14, FIG. 14 is a structural block diagram illustrating a data transmission apparatus according to an exemplary embodiment of the present disclosure, and the apparatus is applied to a terminal, and includes:

a data transmission module 1410, configured to, in response to determining an uplink and downlink transmission conflict in a target time unit, perform downlink data receiving or uplink data sending in the target time unit.

Figure 15:
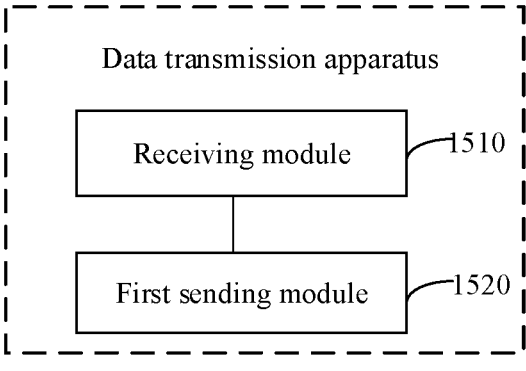
FIG. 15 is a structural block diagram illustrating a data transmission apparatus according to another exemplary embodiment of the present disclosure.

With reference to FIG. 15, FIG. 15 is a structural block diagram illustrating a data transmission apparatus according to an exemplary embodiment of the present disclosure, and the apparatus is applied to a network side device, and includes:

a receiving module 1510, configured to receive first target instruction information sent by a terminal, where the first target instruction information is configured to indicate that the terminal does not perform downlink data receiving in a target time unit, and the target time unit is a time unit when there is an uplink and downlink transmission conflict; and a first sending module 1520, configured to send, based on the first target instruction information, target downlink data to the terminal, where the target downlink data is downlink data that is not received by the terminal in the target time unit.

Figure 16:
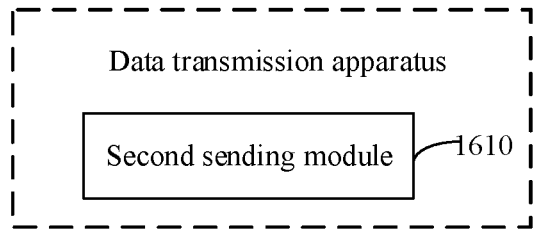
FIG. 16 is a structural block diagram illustrating a data transmission apparatus according to yet another exemplary embodiment of the present disclosure.

With reference to FIG. 16, FIG. 16 is a structural block diagram illustrating a data transmission apparatus according to an exemplary embodiment of the present disclosure, and the apparatus is applied to a network side device, and includes:

a second sending module 1610, configured to, in response to determining a possible uplink and downlink transmission conflict for a terminal in a target time unit, send second target instruction information to the terminal, where the second target instruction information is configured to instruct the terminal to perform downlink data receiving or uplink data sending in the target time unit when there is an uplink and downlink transmission conflict.

Since embodiments of the device substantially correspond to embodiments of the method, relevant parts may be referred to the description of the embodiments of the method. The embodiments of the device described above are merely schematic, where the units described as separate components may or may not be physically separate, and the components displayed as units may or may not be physical units, i.e., the components displayed as units may be located in one place or distributed to a plurality of network units.

Some or all of these modules can be selected according to actual needs to achieve the purpose of the solution of the present disclosure. It may be understood and implemented by those skilled in the art without creative work.

Correspondingly, the present disclosure further provides a computer-readable storage medium storing computer programs, where the programs, when executed by a processor, cause the processor to perform any one of the data transmission methods of the terminal.

Correspondingly, the present disclosure further provides a computer-readable storage medium storing computer programs, where the programs, when executed by a processor, cause the processor to perform any one of the data transmission methods of the network side device.

Correspondingly, the present disclosure provides a data transmission device, and the device includes:

a processor, and a memory storing instructions executable by the processor;

where the processor is configured to perform any one of the data transmission methods of the terminal.

Figure 17:
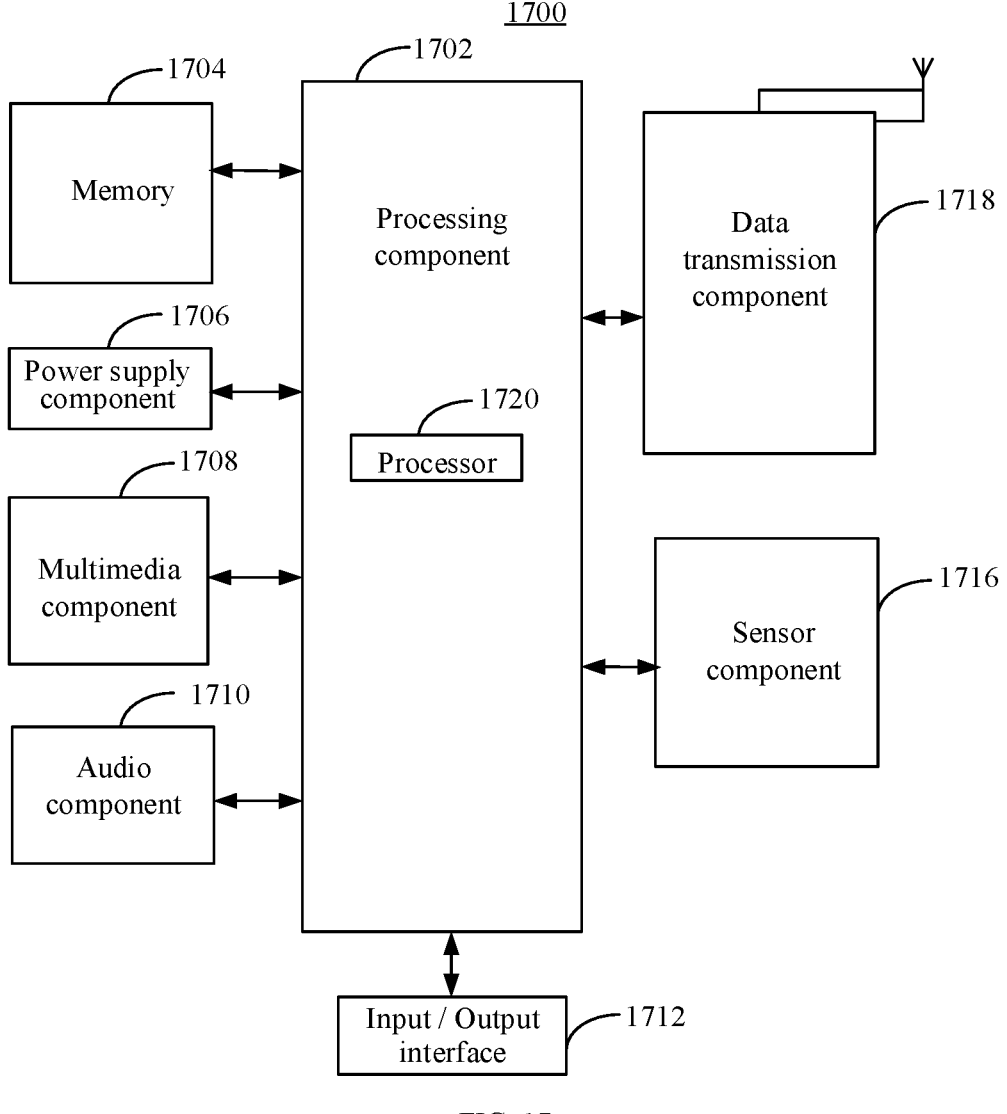
FIG. 17 is a structural schematic diagram illustrating a data transmission device according to an exemplary embodiment of the present disclosure.

FIG. 17 is a structural schematic diagram illustrating an electronic device 1700 according to an example of the present disclosure. For example, the electronic device 1700 may be a mobile phone, a tablet computer, an e-book reader, a multimedia player, a wearable device, a vehicle-mounted terminal, an iPad, a smart TV, or other terminal.

As shown in FIG. 17, the electronic device 1700 may include one or more assemblies of a processing component 1702, a memory 1704, a power supply component 1706, a multimedia component 1708, an audio component 1710, an Input/Output (I/O) interface 1712, a sensor component 1716, and a data transmission component 1718.

The processing component 1702 generally controls the overall operation of the electronic device 1700, such as operations associated with displays, phone calls, data transmissions, camera operations, and recording operations. The processing component 1702 may include one or more processors 1720 to execute instructions to complete all or part of the blocks of the above data transmission methods. Further, the processing component 1702 may include one or more modules to facilitate interaction between the processing component 1702 and another component. For example, the processing component 1702 may include a multimedia module to facilitate the interaction between the multimedia component 1708 and the processing component 1702. For another example, the processing component 1702 may read executable instructions from the memory to perform steps in the data transmission method provided in an example as described above.

The memory 1704 is configured to store different types of data to support operation at the electronic device 1700. Examples of such data include instructions, contact data, phonebook data, messages, pictures, videos, and so on for any application or method that operates on the electronic device 1700. The memory 1704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1706 provides power to different assemblies of the electronic device 1700. The power supply component 1706 may include a power source management system, one or more power sources, and other assemblies associated with generating, managing, and distributing power for the electronic device 1700.

The multimedia component 1708 includes a display screen that provides an output interface between the electronic device 1700 and a user. In some embodiments, the multimedia component 1708 may include a front camera and/or a rear camera. When the electronic device 1700 is in an operating mode, such as in a shooting mode or a video mode, the front camera and/or the rear camera may receive external multimedia data. Each of the front camera and the rear camera may be a fixed optical lens system or have a focal length and a capability of an optical zoom.

The audio component 1710 is configured to output and/or input an audio signal. For example, the audio component 1710 includes a microphone (MIC). When the electronic device 1700 is in an operating mode, for example, in a call mode, a recording mode or a speech recognition mode, the microphone is configured to receive an external audio signal. The received audio signal may be further stored in the memory 1704 or sent via the data transmission component 1718. In some embodiments, the audio component 1710 also includes a speaker for outputting an audio signal.

The I/O interface 1712 may provide an interface between the processing component 1702 and peripheral interface modules. The above peripheral interface modules may include a keyboard, a click wheel, buttons, and so on. Such buttons may include, but are not limited to: a home button, a volume button, a start button, and a lock button.

The sensor component 1716 includes one or more sensors for evaluating states of the electronic device 1700 in different aspects. For example, the sensor component 1716 may detect the on/off status of the electronic device 1700, and the relative positioning of the component, for example, the component is a display and a keypad of the electronic device 1700. The sensor component 1716 may also detect a change in position of the electronic device 1700 or a component of the electronic device 1700, a presence or absence of the contact between a user and the electronic device 1700, an orientation or an acceleration/deceleration of the electronic device 1700, and a change in temperature of the electronic device 1700. The sensor component 1716 may include a proximity sensor configured to detect the presence of a nearby object without any physical contact. The sensor component 1716 may also include an optical sensor, such as a CMOS or CCD image sensor used in an imaging application. In some embodiments, the sensor component 1716 may also include an acceleration sensor, a gyroscope sensor, a magnetic sensor, a pressure sensor, or a temperature sensor.

The data transmission component 1718 is configured to facilitate wired or wireless data transmission between the electronic device 1700 and other devices. The electronic device 1700 may access a wireless network based on a data transmission standard, such as Wi-Fi, 2G, 3G, 4G, 5G, or 6G, or a combination thereof. In some embodiments, the data transmission component 1718 may receive a broadcast signal or broadcast-related information from an external broadcast management system via a broadcast channel. In an example, the data transmission component 1718 may also include a Near Field Communication (NFC) module to facilitate short-range data transmissions. For example, the NFC module may be implemented based on radio frequency identification (RFID) technology, infrared data association (IrDA) technology, ultra-wideband (UWB) technology, Bluetooth (BT) technology, and other technologies.

In some illustrative embodiments, the electronic device 1700 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to perform any one of the data transmission methods of the terminal.

In an example embodiment, there is also provided a non-transitory machine-readable storage medium including instructions, such as a memory 1704 including instructions, where the instructions are executable by the processor 1720 of the electronic device 1700 to implement the method of controlling temperature as described above. For example, the non-transitory computer-readable storage medium may be a Read-Only Memory (ROM), a Random Access Memory (RAM), a CD-ROM, a magnetic tape, a floppy disk, and an optical data storage device, etc.

Correspondingly, the present disclosure provides a data transmission device, and the device includes:

a processor, and a memory storing instructions executable by the processor;

where the processor is configured to perform any one of the data transmission methods of the network side device.

Figure 18:
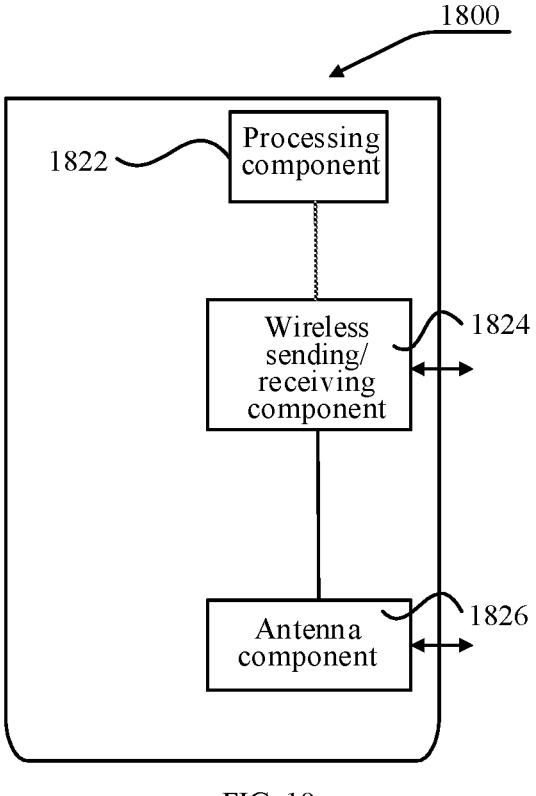
FIG. 18 is a structural schematic diagram illustrating a data transmission device according to another exemplary embodiment of the present disclosure.

As illustrated in FIG. 18, FIG. 18 is a structural schematic diagram of a data transmission device 1800 according to an exemplary embodiment. The device 1800 may be provided as a network-side device. Referring to FIG. 18, the apparatus 1800 includes a processing component 1822, a wireless sending/receiving component 1824, an antenna component 1826, and a signal processing portion specific to a wireless interface. The processing component 1822 may further include one or more processors.

One of the processors in the processing component 1822 may be configured to execute any one of the data transmission methods of the base station.

The embodiments of the present disclosure provide technical solutions that may include the following beneficial effects.

In the embodiments of the present disclosure, the terminal can perform only downlink data receiving or only uplink data sending in a target time unit when there is an uplink and downlink transmission conflict in the target time unit, thus the problem of the uplink and downlink transmission conflict can be effectively solved in satellite communication.

In the embodiments of the present disclosure, the terminal may perform the downlink data receiving or the uplink data sending in the target time unit when there is an uplink and downlink transmission conflict based on the first target transmission mode. In an embodiment, the terminal may determine the first target transmission mode based on the protocol, or the terminal may determine the first target transmission mode based on the received target signaling, such that the problem of the uplink and downlink transmission conflict in the satellite communication is effectively solved.

In the embodiments of the present disclosure, when the uplink data sending has been performed in the target time unit, the terminal may send the first target instruction information to inform the network side device that the terminal does not perform the downlink data receiving in the target time unit. So that the network side device sends the target downlink data to the terminal, where the target downlink data is the downlink data that is not received by the terminal in the target time unit. When the uplink data sending is performed in the target time unit when there is an uplink and downlink transmission conflict, the purpose of obtaining the unreceived target downlink data is achieved, and the normal operations of terminal services are ensured in the satellite communication.

In the embodiments of the present disclosure, the terminal may also perform the downlink data receiving or the uplink data sending in the target time unit based on the received second target instruction information. In response to determining that there is an uplink and downlink transmission conflict in the target time unit, the second target instruction information is configured to instruct the terminal to perform the downlink data receiving or the uplink data sending in the target time unit. Thus, the problem of the uplink and downlink transmission conflict in satellite communication is solved.

In the embodiments of the present disclosure, when the second target instruction information indicates that the transmission mode of the terminal on at least one downlink bandwidth part is determined to be the second target transmission mode, the terminal may perform the uplink data sending in the target time unit, i.e., the terminal does not perform the downlink data receiving. Alternatively, when the second target instruction information indicates that the transmission mode of the terminal on at least one downlink bandwidth part is determined to be the second target transmission mode, the terminal may perform the downlink data receiving in the target time unit, i.e., the terminal does not perform the uplink data sending. Thus, the problem of the uplink and downlink transmission conflict in satellite communication is effectively solved.

After considering the specification and practicing the present disclosure, a person skilled in the art would easily conceive of other implementations of the present disclosure. The present disclosure is intended to cover any variations, uses, modifications, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise construction described herein and shown in the drawings, and that various modifications and changes may be made without departing from the scope thereof. The scope of the disclosure is to be limited only by the appended claims.

The invention claimed is:

1. A data transmission method, applied to a terminal, and comprising:
in response to determining an uplink and downlink transmission conflict in a target time unit, performing downlink data receiving or uplink data sending in the target time unit;
wherein performing the downlink data receiving or the uplink data sending in the target time unit comprises:
performing, based on a first target transmission mode, the downlink data receiving or the uplink data sending in the target time unit;
wherein the method further comprises:
determining, based on a protocol, the first target transmission mode; or
determining, based on received target signaling, the first target transmission mode,
wherein the target signaling is configured to indicate the first target transmission mode;

receiving target downlink data within a preset time period, wherein the target downlink data is downlink data that is not received by the terminal in the target time unit.

2. The method of claim 1 further comprising:
in response to performing the uplink data sending in the target time unit, sending first target instruction information, wherein the first target instruction information is configured to indicate that the terminal does not perform the downlink data receiving in the target time unit.

3. The method of claim 2, wherein sending the first target instruction information comprises:
sending the first target instruction information through an uplink data channel or an uplink control channel.

4. The method of claim 2, wherein sending the first target instruction information comprises:
multiplexing hybrid automatic repeat request (HARQ) instruction information to send the first target instruction information; or
sending predefined signaling as the first target instruction information; or
sending a specified signal or specified signaling at a preset location.

5. The method of claim 2, further comprising:
receiving target downlink data within a preset time period after sending the first target instruction information.

6. The method of claim 2, further comprising:
sending transmission instruction information; and
receiving target downlink data, wherein the target downlink data is downlink data that is not received by the terminal in the target time unit.

7. The method of claim 1, wherein performing the downlink data receiving or the uplink data sending in the target time unit comprises:
performing, based on received second target instruction information, the downlink data receiving or the uplink data sending in the target time unit,
wherein the second target instruction information is configured to instruct the terminal to perform the downlink data receiving or the uplink data sending in the target time unit when there is the uplink and downlink transmission conflict in the target time unit.

8. The method of claim 7, wherein the second target instruction information is configured to indicate a transmission mode of the terminal on at least one downlink bandwidth part and/or at least one uplink bandwidth part preallocated for the terminal.

9. The method of claim 8, wherein performing, based on received second target instruction information, the downlink data receiving or the uplink data sending in the target time unit comprises:
in response to determining that the second target instruction information is configured to indicate that the transmission mode of the terminal on at least one downlink bandwidth part is a second target transmission mode, performing the uplink data sending in the target time unit; and
in response to determining that the second target instruction information is configured to indicate that the transmission mode of the terminal on at least one uplink bandwidth part is the second target transmission mode, performing the downlink data receiving in the target time unit.

10. The method of claim 7, further comprising:
receiving the second target instruction information in each time unit; or receiving, after determining at least one time unit for receiving the second target instruction information based on configuration information corresponding to the second target instruction information, the second target instruction information in the at least one time unit.

11. A data transmission method, applied to a network side device, and comprising:

receiving first target instruction information sent by a terminal, wherein the first target instruction information is configured to indicate that the terminal does not perform downlink data receiving in a target time unit, and the target time unit is a time unit when there is an uplink and downlink transmission conflict; and sending, based on the first target instruction information, target downlink data to the terminal, wherein the target downlink data is downlink data that is not received by the terminal in the target time unit;

wherein the method further comprises, before receiving the first target instruction information sent by the terminal:

sending target signaling for indicating a first target transmission mode to the terminal, wherein the first target transmission mode is configured to instruct the terminal to perform downlink data receiving or uplink data sending in the target time unit when there is an uplink and downlink transmission conflict, wherein sending the target downlink data to the terminal comprises:

sending the target downlink data to the terminal within a preset time period after receiving the first target instruction information.

12. The method of claim 11, wherein sending the target downlink data to the terminal comprises:

sending the target downlink data to the terminal within a preset time period; or sending, based on transmission instruction information sent by the terminal, the target downlink data to the terminal.

13. The method of claim 11, further comprising:

in response to determining a possible uplink and downlink transmission conflict for a terminal in a target time unit, sending second target instruction information to the terminal, wherein the second target instruction information is configured to instruct the terminal to perform downlink data receiving or uplink data sending in the target time unit when there is an uplink and downlink transmission conflict in the target time unit.

14. The method of claim 13, wherein the second target instruction information is configured to indicate a transmission mode of the terminal on at least one downlink bandwidth part and/or at least one uplink bandwidth part pre-allocated for the terminal.

15. A data transmission device, comprising:

a processor;

a memory storing instructions executable by the processor;

wherein the processor is configured to perform operations comprising:

in response to determining an uplink and downlink transmission conflict in a target time unit, performing downlink data receiving or uplink data sending in the target time unit;

wherein performing the downlink data receiving or the uplink data sending in the target time unit comprises:

performing, based on a first target transmission mode, the downlink data receiving or the uplink data sending in the target time unit;

wherein the method further comprises:

determining, based on a protocol, the first target transmission mode; or determining, based on received target signaling, the first target transmission mode, wherein the target signaling is configured to indicate the first target transmission mode;

receiving target downlink data within a preset time period, wherein the target downlink data is downlink data that is not received by the terminal in the target time unit.

* * * * *